United States Patent
Wang et al.

(10) Patent No.: US 10,536,876 B2
(45) Date of Patent: *Jan. 14, 2020

(54) METHODS AND SYSTEM FOR COMMUNICATING CONTROL INFORMATION USING CARRIER AGGREGATION

(71) Applicant: INTEL CORPORATION, Santa Clara, CA (US)

(72) Inventors: Ping Wang, Beijing (CN); Jong-Kae Fwu, Sunnyvale, CA (US); Kamran Etemad, Potomac, MD (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,934

(22) Filed: Oct. 17, 2016

(65) Prior Publication Data

US 2019/0037432 A1    Jan. 31, 2019

Related U.S. Application Data

(63) Continuation of application No. 14/455,099, filed on Aug. 8, 2014, now Pat. No. 9,473,972, which is a
(Continued)

(51) Int. Cl.
*H04W 72/04*    (2009.01)
*H04W 28/02*    (2009.01)
(Continued)

(52) U.S. Cl.
CPC ...... *H04W 28/0231* (2013.01); *H04B 7/0413* (2013.01); *H04B 7/0417* (2013.01); *H04B 7/0452* (2013.01); *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01);
(Continued)

(58) Field of Classification Search
CPC ....................................................... H04W 72/04
See application file for complete search history.

(56) References Cited

U.S. PATENT DOCUMENTS

2014/0036740 A1 *    2/2014    Lee ............... H04W 72/0406
370/280

* cited by examiner

Primary Examiner — Sulaiman Nooristany

(57) ABSTRACT

An apparatus may include a radio frequency (RF) transceiver to receive a first message over a first carrier in a first band in a downlink sub-frame of a first radio frame in a communications link, where the communications link comprises interband carriers aggregated over primary and secondary cells. The apparatus may also include a processor and a reply message assignment module operable on the processor to determine a downlink sub-frame in which the downlink transmission is received and to adjust timing of a reply/acknowledge message to be sent by the RF transceiver in response to the first message so as to coincide with a predetermined uplink sub-frame of a radio frame. Other embodiments are described and claimed.

12 Claims, 9 Drawing Sheets

Related U.S. Application Data continuation of application No. 13/976,005, filed as application No. PCT/US2011/053689 on Sep. 28, 2011, now Pat. No. 8,817,755.

(60) Provisional application No. 61/481,024, filed on Apr. 29, 2011.

(51) Int. Cl.
| | |
|---|---|
| H04N 21/2365 | (2011.01) |
| H04N 21/643 | (2011.01) |
| H04J 11/00 | (2006.01) |
| H04L 5/00 | (2006.01) |
| H04L 27/26 | (2006.01) |
| H04B 7/0417 | (2017.01) |
| H04L 29/06 | (2006.01) |
| H04W 52/02 | (2009.01) |
| H04W 12/06 | (2009.01) |
| H04W 12/08 | (2009.01) |
| H04W 88/02 | (2009.01) |
| H04W 4/70 | (2018.01) |
| H04B 7/0456 | (2017.01) |
| H04W 48/06 | (2009.01) |
| H04L 12/803 | (2013.01) |
| H04L 12/801 | (2013.01) |
| H04L 1/18 | (2006.01) |
| H04L 1/00 | (2006.01) |
| H04B 7/0413 | (2017.01) |
| H04W 68/00 | (2009.01) |
| H04B 7/0452 | (2017.01) |
| H04W 72/12 | (2009.01) |
| H04W 36/14 | (2009.01) |
| H04B 7/06 | (2006.01) |
| H04W 88/06 | (2009.01) |
| H04W 84/12 | (2009.01) |
| H04W 88/10 | (2009.01) |

(52) U.S. Cl.
CPC ...... *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/70* (2018.02); *H04W 12/06* (2013.01); *H04W 12/08* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04W 88/02* (2013.01); *H04B 7/0465* (2013.01); *H04B 7/0478* (2013.01); *H04B 7/0632* (2013.01); *H04B 7/0639* (2013.01); *H04W 36/14* (2013.01); *H04W 84/12* (2013.01); *H04W 88/06* (2013.01); *H04W 88/10* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/21* (2018.01); *Y02D 70/26* (2018.01); *Y02D 70/444* (2018.01)

| UL-DL Configuration | | Subframe n | | | | | | | | | |
|---|---|---|---|---|---|---|---|---|---|---|---|
| | | 0 | 1 | 2 | 3 | 4 | 5 | 6 | 7 | 8 | 9 |
| Group 1 | 0 | - | - | 7,6 | - | - | - | - | 7,6 | - | - |
| | 1 | - | - | 8,7,6 | - | - | - | - | 8,7,6 | - | - |
| | 2 | - | - | 8,7,4,6 | - | - | - | - | 8,7,4,6 | - | - |
| | 6 | - | - | 7,6 | - | - | - | - | 8,7,6 | - | - |
| Group 2 | 3 | - | - | 13,7,6,11 | 13,6,5 | - | - | - | - | - | - |
| | 4 | - | - | 12,8,7,11 | 6,5,4,7 | - | - | - | - | - | - |
| Group 3 | 5 | - | - | 13,12,9,8,7,5,4,11,6 | - | - | - | - | - | - | - |

*FIG. 7*

METHODS AND SYSTEM FOR COMMUNICATING CONTROL INFORMATION USING CARRIER AGGREGATION

This application is a continuation of, claims the benefit of, and priority to U.S. patent application Ser. No. 14/455,099 filed Aug. 8, 2014, which is a continuation of previously filed U.S. patent application Ser. No. 13/976,005 filed Jun. 25, 2013, which is a U.S. national phase application of PCT/US2011/053689 filed Sep. 28, 2011, which claims priority to U.S. provisional patent application Ser. No. 61/481,024, filed Apr. 29, 2011; all of the above are incorporated by reference herein in their entirety.

BACKGROUND

As wireless technology develops, in order to enhance and provide new capabilities and to accommodate increased usage, there is a constant need to improve data rates and efficiency of data transmission over wireless networks. Different standards have attempted to address this need in various ways. In recently developed LTE standards, for example, one approach to increase data rates is the use of so-called carrier aggregation (CA). In carrier aggregation, two or more component carriers (frequency blocks used for communications) are aggregated and jointly used for transmission to/from a single mobile terminal (also referred to as user equipment or "UE"). When carrier aggregation is initiated, a primary serving cell (PCell) can be initially configured to a UE by eNodeB and subsequently secondary serving cells (SCell) can also be added to this UE by eNodeB, which may serve to increase data rates.

In particular, multiple component carriers (CC) can be aggregated to support wider transmission bandwidths, for example, up to 100 MHz, in presently envisioned schemes. For example, in LTE-A ($3^{rd}$ Generation Partnership Project, Technical Specification Group Radio Access Network; Evolved Universal Terrestrial Radio Access (E-UTRA) (release 10), June 2011), two component carriers may be aggregated to form a 40 MHz bandwidth for frequency division duplex (FDD) or time division duplex (TDD) schemes. For LTE Rel-10 TDD system, only the intraband carrier aggregations are supported, wherein physical uplink control channel (PUCCH) is transmitted on one primary cell (PCell) and wherein the UL-DL configurations shall be the same, while in developing standards, such as LTE Release 11, the interband carrier aggregations can be supported with the different UL-DL configurations on the interband carrier frequencies. In one possible approach, intraband carrier aggregation may group multiple carriers within a band. Such intraband carrier aggregation can be applied to both frequency division duplex (FDD) and time division duplex (TDD) schemes. Another possibility is the so-called interband carrier aggregation, in which carriers between different bands are aggregated. The interband carrier aggregation, when used for TDD system, may include different uplink-downlink (UL-DL) configurations on different bands. However, the uplink subframes and downlink subframes may overlap on different UL-DL configurations of the interband carrier frequencies. This may compromise the ability to send control messages such as acknowledgement/non-acknowledgement (ACK/NACK) messages because of the conflict in timing for the control messages. For example, in response to downlink transmissions that may take place over a physical downlink shared channel (PDSCH), the UE provides a feedback ACK/NACK message via an uplink channel, such as a physical uplink control channel (PUCCH) or physical uplink shared channel (PUSCH). In an interband aggregation scenario, the PDSCH transmission may be sent over a secondary serving cell, or secondary cell (SCell) in a given sub-frame. However, the communications protocols, such as those specified in LTE release 10, may require the feedback of the ACK/NACK message to take place on the primary serving cell (also termed primary cell or Pcell) only, which may have a different UL-DL configuration from the SCell, meaning that the uplink sub-frames and downlink subframes are arranged in a different UL-DL configuration within a radio frame. Therefore, in some cases of interband carrier aggregation, the uplink ACK/NACK message can not be transmitted because, unlike in the subframe arrangement in the Scell, the given sub-frame of a primary cell (PCell) required to carry the feedback may be a downlink rather than the required uplink.

It is with respect to these and other considerations that the present improvements have been needed.

BRIEF DESCRIPTION OF THE DRAWINGS

FIG. 7 depicts another embodiment of an adapted downlink association set index.

DETAILED DESCRIPTION

Figure 1:
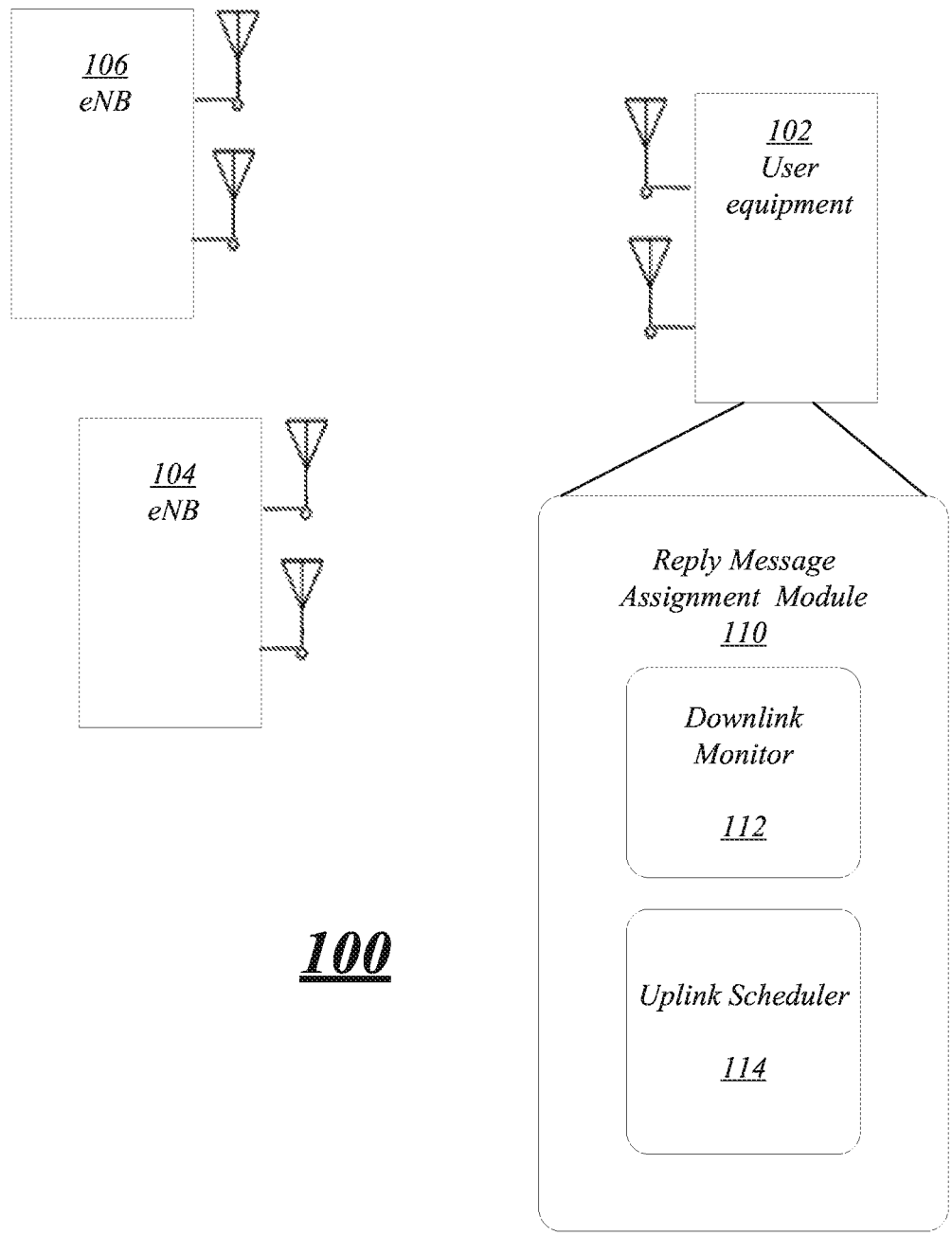
FIG. 1 depicts an exemplary system.

Various embodiments may be generally directed to systems that employ wireless communications using time division duplex (TDD). Some embodiments may be particularly directed to systems, architecture and methods for managing reply messages in multicarrier communications.

Various embodiments are directed to wireless communications where carriers are aggregated including in so-called interband carrier aggregation. Embodiments may particularly provide for transmission of control messages in systems that employ TDD communication together with interband carrier aggregation. In particular, acknowledgement and non-acknowledge messages (ACK/NAK) including hybrid automatic repeat request (HARQ, or "HARQ ACK/NAK) may be successfully conducted in interband carrier aggregation scenarios by use of the arrangements employed by the present embodiments.

Various embodiments address the mechanism by which control information, such as an uplink response/acknowledgement to data transmitted over downlinks is managed. In particular, current standards including LTE release 10 define the manner in which an uplink ACK/NAK message is to be transmitted in response to a downlink transmission, such as data transmitted over a physical downlink shared channel (PDSCH). As detailed below, in known TDD communications schemes, any of the different UL-DL configurations (in LTE-A Release 10, the configurations are listed from 0-6) may be employed by a carrier that transmits the PDSCH transmission. However, under a scenario of interband carrier aggregation, a carrier (the term "carrier" is used interchangeably herein with the term "component carrier") in one band may have a different UL-DL configuration than that of another band. This may cause the required timing of an uplink HARQ ACK/NAK feedback to a downlink transmission sent by a first carrier to be incompatible with the UL-DL configuration of the interband carrier to transmit the HARQ ACK/NAK. Accordingly, the present embodiments address this issue in a novel and inventive manner.

In one embodiment, a method may comprise determining a downlink sub-frame in which the downlink transmission is received in a first radio frame of a communications link comprising a multiplicity of carriers distributed over a primary cell and set of secondary cells, scheduling a first reply message to the first message in one or more uplink sub-frames of a first carrier of the multiplicity of carriers, and scheduling a reply message to the first message in one or more uplink sub-frames of a second carrier of the multiplicity of carriers.

The method may further include sending the first reply message comprising in a first PUCCH multiple times over respective multiple uplink subframes of the first carrier; and sending the second reply message comprising a second PUCCH multiple times over respective multiple uplink subframes of the second carrier.

The method may also include sending the first carrier using a first uplink-downlink configuration and sending the second carrier using a second uplink-downlink configuration.

In another embodiment, a method may comprise determining a downlink sub-frame in which a downlink transmission is received over a carrier in a communications link comprising a multiplicity of carriers distributed over a primary cell and set of secondary cells, scheduling a reply message in an uplink subframe at a predetermined interval after the first message, and selecting a carrier of the multiplicity of carriers for transmitting the reply message based upon availability of an uplink in that carrier at the predetermined interval.

The method may further include scheduling only one reply message in a single uplink sub-frame in response to the first message.

The method may also include scheduling the reply message over an uplink of a secondary serving cell when a primary serving cell does not include an uplink sub-frame at the predetermined interval.

Consistent with the present embodiments, FIG. 1 depicts a system 100 including a UE 102, base station (also termed eNodeB or eNB) 104, eNB 106, and a timing module, referred to herein as a reply message assignment module 110. In some embodiments, components of system 100 may employ a radio technology such as IEEE 802.16 (WiMAX), IEEE 802-20, LTE evolved UTRA (E-UTRA), LTE-A, etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE.

The reply message assignment module 110 may be included in UE 102 and/or eNB 104, 106. The reply message assignment module 110 may facilitate scheduling of HARQ ACK/NAK sent by UE 102 in response to a PDSCH transmission from eNB 104 or eNB 106. In various embodiments, reply message assignment module 110 may operate to schedule HARQ ACK/NAK for interband carrier aggregation where component carriers in different bands are scheduled for UE 102. In different scenarios, either of eNB 104 or eNB 106 may serve as a PCell and/or Scell for the purposes of interband carrier aggregation. The reply message assignment module 110 may include a downlink monitor 112 that serves to monitor downlink transmissions including PDSCH transmissions sent to UE 102. The downlink monitor 112 may determine a sub-frame of a radio frame in which the downlink transmission takes place so that UE 102 can schedule a HARQ ACK/NAK response when appropriate.

The reply message assignment module 110 also includes an uplink scheduler that may determine an uplink sub-frame or subframes for transmitting a HARQ ACK/NAK in response to a received downlink transmission. In particular, the uplink scheduler 114 may determine timing for an uplink transmission to be sent over a different carrier than the carrier used to send the downlink transmission.

Figures 2A, 2B, 2C:
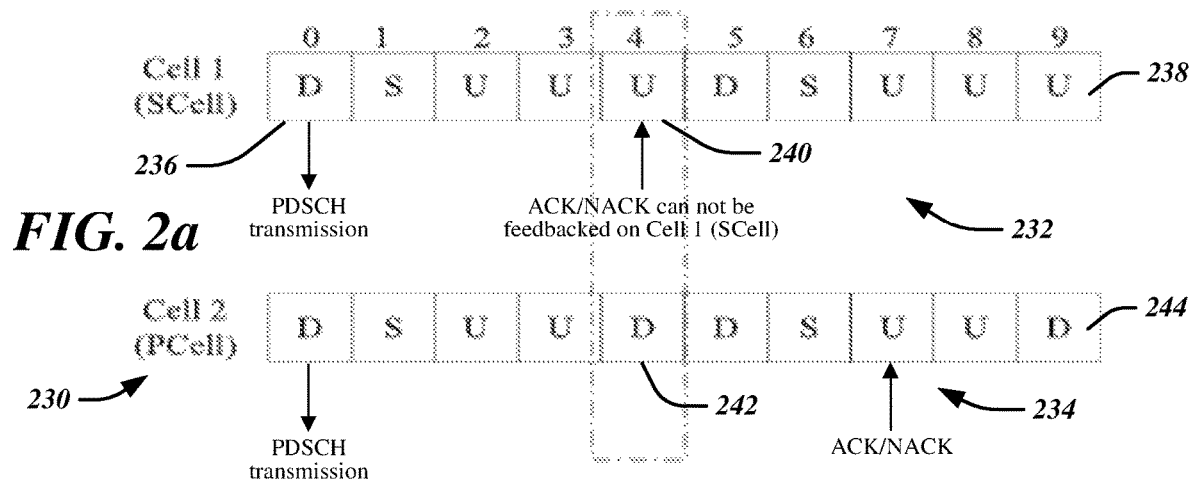
FIG. 2a depicts a scenario of a timing conflict.
FIG. 2b depicts one embodiment of an adapted downlink association set.
FIG. 2c presents a known uplink-downlink configuration scheme.

When the carrier is an interband carrier, the uplink scheduler may determine the appropriate uplink sub-frame based on procedures detailed below. These procedures may overcome timing problems in current LTE standards for transmitting HARQ ACK/NAK. FIG. 2a illustrates an example of HARQ timing issues that may arise in the case of different interband CCs having different UL-DL configurations as specified in LTE release 10. In particular, FIG. 2a presents a scenario that is prohibited by the LTE release 10 due to timing conflicts. FIG. 2a illustrates an interband CC scenario 230 where an SCell has a first UL-DL configuration 232 and where the PCell has a second, different UL-DL configuration 234. In the scenario 230, the SCell transmits a downlink PDSCH over subframe 236, which is the $0^{th}$ subframe of the radio frame 238. Although the LTE standard may specify an uplink ACK/NAK to be fed-back in response to the PDSCH over the $4^{th}$ uplink subframe 240, the LTE Release 10 standard specifies that only the PCell may transmit the ACK/NAK response. Accordingly, the ACK/NAK uplink response to the PDSCH received over downlink subframe 236 would be scheduled for $4^{th}$ subframe 242 of Pcell radio frame 244. However, 4th subframe 242 is a downlink, not an uplink. Accordingly, current LTE HARQ timing rules do not support interband carrier aggregation where the UL-DL configurations differ between carriers, which can lead to conflicts such as that illustrated in FIG. 2a.

In some embodiments, the reply message assignment module 110 may include in the uplink scheduler 114 a structure such as a downlink association set index to map the downlink sub-frames carrying a PDSCH transmission or other transmission to an uplink sub-frame or sub-frames for carrying a response to the downlink PDSCH transmission.

FIG. 2b depicts one embodiment of an adapted downlink association set index 200. The downlink association set index 200 is arranged to map downlink subframes to an uplink subframe 202 for transmitting a reply message to a transmission carried on the downlink subframes. The mapping is shown the for each of the different TDD UL-DL configurations 204 that are specified by the LTE-A (release 10) standard, and illustrated in known frame structure 220 of FIG. 2c. In particular, frame structure 220 lists the type of sub-frame for each of the ten subframes 222 for each of the seven UL-DL configurations 204. For example, as depicted in FIG. 2c the UL-DL configuration zero includes downlinks in the subframes numbered "0", "1", "5" and "6" (and labeled either "D" or "S" to indicate a downlink subframe or special subframe), and includes uplinks in subframes numbered "2", "3", "4", "7", "8" and "9" (and labeled "U" to indicate a uplink subframe).

The entries in the adapted downlink association set index 202 are arranged to populate an uplink subframe that may transmit an acknowledgment message in response to a downlink transmission. The entries specify the timing relationship between the downlink transmission and a scheduled uplink transmission for each UL-DL configuration. In particular, the entries (termed "index" or "indices" hereinafter) for downlink association set index 202 populate a single subframe position 206 for each UL-DL configuration. In this embodiment, the indices all populate subframe number "2", which is the third of ten subframes in a given radio frame. For each UL-DL configuration, there is a different combination of indices based upon the particular UL-DL configuration, as explained below. In particular, the value of each index specifies the offset or interval in units of sub-frames between when a downlink transmission takes place and when the uplink acknowledgment message in response to the downlink transmission is to take place.

Turning now to FIGS. 3-6 there are shown exemplary mapping arrangements that illustrate the operation of adapted downlink association set index 200 for various UL-DL configurations. Consistent with the present embodiments, the UL-DL configurations illustrated in FIGS. 3-6 may be deployed in a scenario in which multiple carriers are scheduled to a UE. Thus, four different configurations illustrated may correspond to those used by different component carriers in an interband carrier aggregation scenario in which a single UE communicates over component carriers located in different bands. Thus, a carrier within one band may be scheduled in a first UL-DL configuration while a carrier in another band may be scheduled in another UL-DL configuration.

Figure 3:
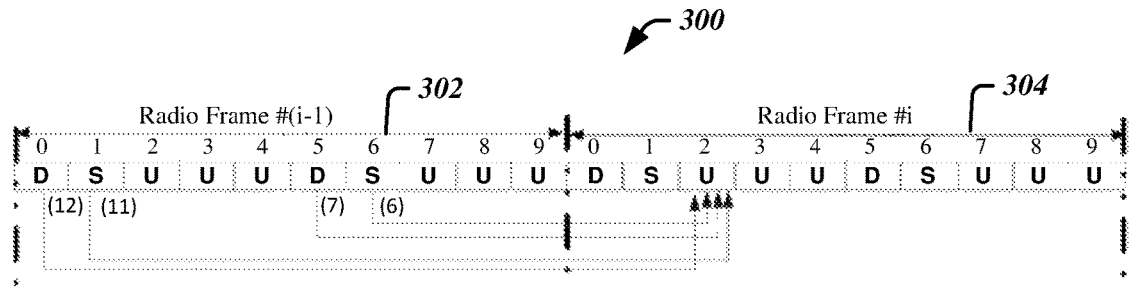
FIG. 3 depicts a mapping arrangement consistent with the present embodiments.

FIG. 3 depicts a mapping arrangement 300 for the UL-DL configuration "0", which configuration is also illustrated in FIG. 2c and described above. In FIG. 3 multiple mapping scenarios are depicted, each represented by an arrow. As illustrated, the main concept of the above exemplary HARQ timing mapping in FIG. 2c is to use only the common uplink subframes in all the used DL/UL configurations. In particular, the downlink subframes specified by the UL-DL configuration are mapped to an uplink subframe according to the entries in the downlink association set index 200. In this case, all downlink subframes are mapped to a single uplink subframe, which is the subframe "2." Thus, in a radio frame 302, downlink transmissions may take place in subframes numbered "0", "1", "5", and "6", and an uplink subframe scheduled to transmit the HARQ ACK/NAK message is the subframe "2" of the subsequent radio frame 304. Consider, for example, a downlink transmission in the subframe "0" of radio frame 302, where the index "(12)" (see indices listed under subframe position 206 of FIG. 2b) indicates that the uplink response to the downlink transmission is to be scheduled at an interval of twelve subframes after the subframe "0" zero. This interval corresponds to the subframe "2" of the subsequent radio frame 304, as illustrated. Similarly, for a downlink transmission in the subframe "1" of radio frame 302, the index "(11)" indicates that the uplink response to the downlink transmission is to be scheduled at an interval of eleven subframes after the subframe "1" of radio frame 302, which also corresponds to the subframe "2" of the subsequent radio frame 304. Likewise, downlink transmissions scheduled over subframes "6" or "7" of radio frame 302 are mapped to the subframe "2" of the subsequent radio frame 304 via respective indices "(7)" and "(6)."

Figure 4:
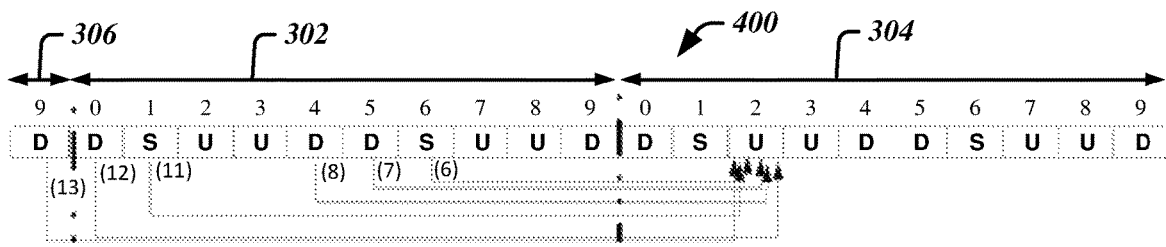
FIG. 4 shows another mapping arrangement consistent with the present embodiments.

Turning now to FIG. 4, there is shown a mapping for the UL-DL configuration "1," which configuration is also detailed in FIG. 2c. In this case, as in FIG. 3, all downlink subframes are mapped to a single uplink subframe, which is the subframe "2". Thus, in a given radio frame, downlink transmissions may take place in subframes numbered "0", "1", "4", and "5", "6" and "9" and an uplink subframe scheduled to transmit the HARQ ACK/NAK message is the subframe "2" of a subsequent radio frame. As in FIG. 3, the indices listed in FIG. 4 specify the interval between a downlink transmission and the subsequent HARQ ACK/NAK to be carried over an uplink. Thus, for a downlink transmission in the subframe "6" of radio frame 302, the index "(6)" indicates that the uplink response to the downlink transmission is to be scheduled at an interval of six subframes after the subframe "6" of radio frame 302, which also corresponds to the subframe "2" of the subsequent radio frame 304. Likewise, downlink transmissions scheduled over subframe "8" of radio frame 302 is mapped by the index "4" to the subframe "2" of the subsequent radio frame 304.

It is to be noted that the mapping scheme of the present embodiments may entail scheduling an uplink transmission for HARQ ACK/NAK that does not take place in a radio frame immediately subsequent to the radio frame that carries the downlink transmission. Thus, for example, the UL-DL configuration "1" permits downlink transmissions in a subframe "9" of a radio frame as shown in FIGS. 4 and 2c. As further illustrated in FIG. 4, a downlink transmission that occurs in sub-frame "9" of a radio frame 306 is mapped via the index "(13)" to a subframe "2" of radio frame 304, which is not immediately subsequent to radio frame 306. The convention illustrated in FIG. 4 may be in keeping with standards that specify a minimum interval between a downlink transmission and an uplink transmission carrying the ACK/NAK in response. Thus, consistent with the embodiment illustrated in FIG. 4, all ACK/NAK responses to downlink transmissions are to be scheduled in a subframe "2" of a radio frame, and a minimum interval between downlink transmission and ACK/NAK response may be equal four subframes. Accordingly, a downlink transmission scheduled in a subframe "9" of a given radio frame, which is to be acknowledged in a subframe "2" of a subsequent radio frame, cannot be acknowledged in the immediately following radio frame, because the interval between the subframe "9" and immediately following subframe "2" is only equal to three subframes.

Figure 5:
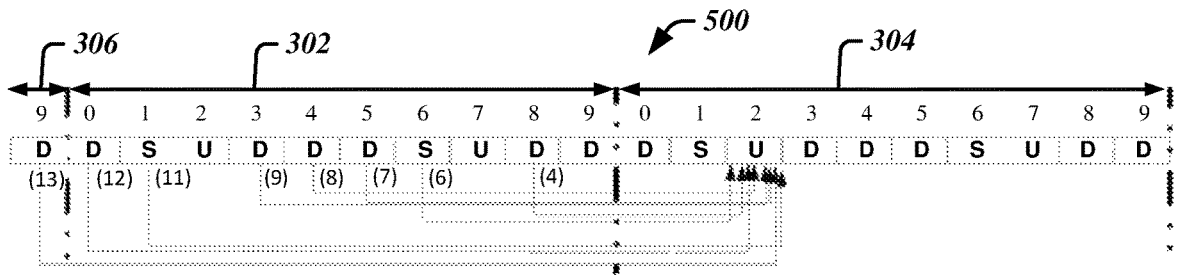
FIG. 5 shows a further mapping arrangement consistent with the present embodiments.

Turning now to FIG. 5, there is shown a mapping for the UL-DL configuration "2," which configuration is also detailed in FIG. 2c. In this case, as in FIGS. 3 and 4, all downlink subframes are mapped to a single uplink subframe, which is the subframe "2". Thus, in a given radio frame, downlink transmissions may take place in subframes numbered "0", "1", "3", "4", and "5", "6", "8" and "9" and an uplink subframe scheduled to transmit the HARQ ACK/NAK message is the subframe "2" of a subsequent radio frame. As in FIGS. 3 and 4, the indices listed in FIG. 5 specify the interval between a downlink transmission and the subsequent HARQ ACK/NAK to be carried over an uplink. Thus, for a downlink transmission in the subframe "3" of radio frame 302, the index "(9)" indicates that the uplink response to the downlink transmission is to be scheduled at an interval of nine subframes after the subframe "3" of radio frame 302, which also corresponds to the subframe "2" of the subsequent radio frame 304. As with the arrangement in FIG. 4, a downlink transmission scheduled in a subframe "9" of a given radio frame, which is to be acknowledged in a subframe "2" of a subsequent radio frame, may not be acknowledged in the immediately following radio frame, because the interval between the subframe "9" and immediately following subframe "2" is only equal to three subframes. Accordingly, as illustrated in FIG. 5, a response to the downlink transmission in subframe "9" of radio frame 306 is scheduled by index "(13)" in the subframe "2" of radio frame 304, rather than in the subframe "2" of radio frame 302.

Figure 6:
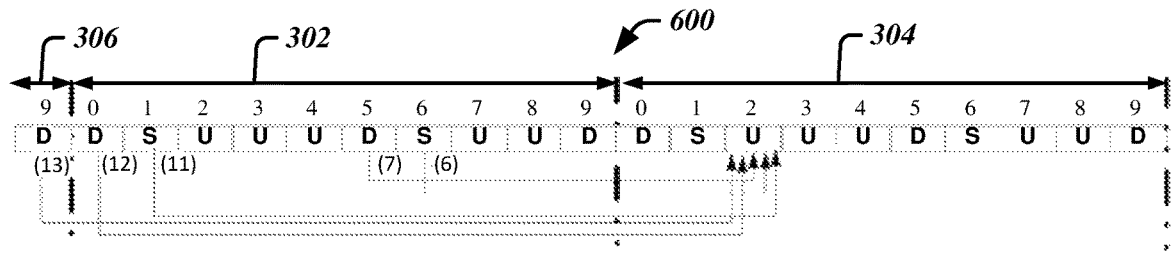
FIG. 6 an additional mapping arrangement consistent with the present embodiments.

Turning now to FIG. 6, there is shown a mapping for the UL-DL configuration "6," which configuration is also detailed in FIG. 2c. In this case, as in FIGS. 3, 4 and 5, all downlink subframes are mapped to a single uplink subframe, which is the subframe "2". Thus, in a given radio frame, downlink transmissions may take place in subframes numbered "0", "1", "3", "4", and "5", "6", "8" and "9" and an uplink subframe scheduled to transmit the HARQ ACK/NAK message is the subframe "2" of a subsequent radio frame. As in FIGS. 3, 5 and 5, the indices listed in FIG. 6 specify the interval between a downlink transmission and the subsequent HARQ ACK/NAK to be carried over an uplink. In addition, as with the arrangement in FIGS. 4 and 5, a downlink transmission scheduled in a subframe "9" of a given radio frame, which is to be acknowledged in a subframe "2" of a subsequent radio frame, may not be acknowledged in the immediately following radio frame, because the interval between the subframe "9" and immediately following subframe "2" is only equal to three subframes. Accordingly, as illustrated in FIG. 6, a response to the downlink transmission in subframe "9" of radio frame 306 is scheduled by index "(13)" in the subframe "2" of radio frame 304, rather than in the subframe "2" of radio frame 302.

For other TDD UL-DL configurations the adapted downlink association set index 200 may be used to map downlink subframes carrying a transmission to the uplink subframe "2" for carrying an ACK/NAK response in a manner similar to that illustrated in FIGS. 3-6. It is also to be noted that in some embodiments, the mapping rules may entail larger indices than those shown in FIGS. 3-6. Thus, referring also to FIGS. 2b and 2c, the UL-DL configuration 4 includes downlinks in subframes "0", "1", "4", "5", "6", "7", "8", and "9." Given this UL-DL configuration, the adapted downlink association set index includes indices "16", "15", "14", and "13" which indices result in skipping one radio frame before scheduling an uplink response to a downlink transmission, as discussed above.

One feature of the embodiments illustrated in FIGS. 2b, and 3-6 is that the timing of uplink responses takes advantage of an uplink subframe that is common to all UL-DL configurations, that is, the subframe "2." This facilitates the ability to schedule a HARQ ACK/NAK response in interband carrier scenarios where only the Pcell is permitted to transmit the HARQ ACK/NAK. Since each UL-DL configuration is arranged to feedback the HARQ ACK/NAK on a common subframe, the transmission of a PDSCH over a downlink of a first carrier using a first UL-DL configuration is assured of being able to be fed back on the Pcell regardless of the UL-DL configuration of the PCell interband carrier.

In other embodiments, rather than employing a single uplink subframe common to all UL-DL configurations, an adapted downlink association set index may divide the UL-DL configurations into groups in which a set of uplinks common to all UL-DL configurations in a particular group is employed. FIG. 7 depicts an embodiment of an adapted downlink association set index 700. As with the downlink association set index 200, the downlink association set index 700 is arranged to map downlink subframes to an uplink subframe 702 for transmitting a reply message, in this case for each of the different TDD UL-DL configurations 204 that are specified by the LTE-A (Release 10) standard, and illustrated in data structure 220 of FIG. 2c. In this embodiment, the UL-DL configurations are grouped into three different groups: "Group 1", "Group 2" and "Group 3." Turning also to FIG. 2c, it can be seen that within each group of the adapted downlink association set index 700, all the UL-DL configurations share at least one common uplink subframe. For example, the UL-DL configurations "0", "1", "2", and "6" of "Group 1" each share a first common uplink subframe "2" and a second common uplink subframe "7." As further depicted in FIG. 7, each of the common uplink subframes "2" and "7" is populated with the indices in each UL-DL configuration of "Group 1." Each index listed in each subframe position of the adapted downlink association set index 700 map each downlink subframe of a given UL-DL configuration to the common uplink subframe containing that index.

Figure 8:
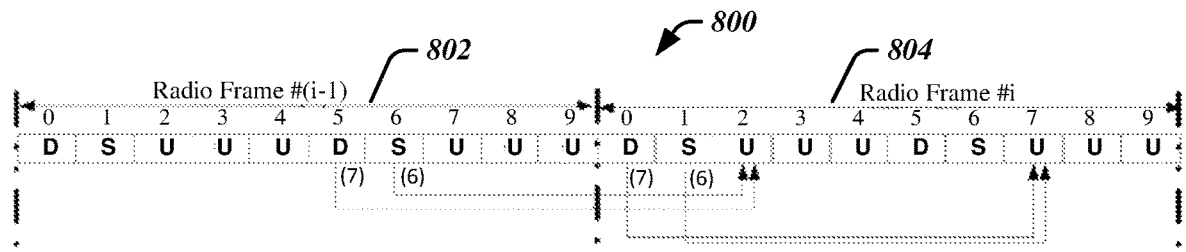
FIG. 8 depicts an exemplary mapping arrangement.

FIG. 8 depicts a mapping arrangement 800 for the UL-DL configuration "0", which configuration is also illustrated in FIG. 2c and described above. In FIG. 8 multiple mapping scenarios are depicted. In particular, the subframes "0", "1", "5", and "6", which may support downlink communications according to the UL-DL configuration "0", are mapped to either subframe "2" of subframe "7." For example, the indices "7" and "6" in subframe "2" of the adapted downlink association set 700 of FIG. 7 specify that a downlink transmission is mapped to the subframe "2" by shifting the downlink by the number of frames specified by the given index. Thus, referring back to FIG. 8, for UL-DL configuration "0" the downlink subframes "5" and "6" of radio frame 802 are mapped to a common uplink subframe "2" of radio frame 804 by shifting seven and six subframes, respectively, from the downlink subframe.

Similarly, the indices "7" and "6" listed in subframe "7" of adapted downlink association set 700 in FIG. 7 indicate that downlink subframes are mapped to the uplink subframe "7" by shifting downlink subframes by seven and six subframes, respectively. This leads to the mapping of subframes "0" and "1" of radio frame 304 to subframe "7" of radio frame 304, as further depicted in FIG. 8.

Figure 9:
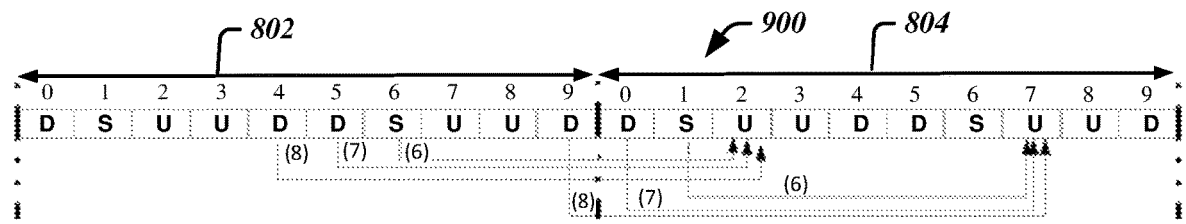
FIG. 9 depicts another mapping arrangement consistent with the present embodiments.

FIG. 9 depicts a mapping arrangement 900 for a second the UL-DL configuration of the "Group 1" of FIG. 7. In the configuration "1" illustrated, the subframes "0", "1", "4", "5", "6", and "9" that may support downlink communications are mapped to either subframe "2" or subframe "7." For example, the indices "8", "7" and "6" in subframe "2" of the configuration "1" in adapted downlink association set 700 of FIG. 7 specify that a downlink transmission is mapped to the subframe "2" by shifting the downlink by the number of frames specified by the given index. Thus, referring back to FIG. 9, for UL-DL configuration "1" the downlink subframes "4", "5" and "6" of radio frame 802 are mapped to a common uplink subframe "2" of radio frame 804 by shifting eight, seven and six subframes, respectively, from the downlink subframe.

Likewise, the indices "8", "7" and "6" listed in subframe "7" of configuration "1" in adapted downlink association set 700 in FIG. 7 indicate that downlink subframes are to be mapped to the uplink subframe "7" by shifting downlink subframes by eight, seven and six subframes, respectively. This leads to the mapping of subframes "9" of radio frame 802, and "0" and "1" of radio frame 804 to subframe "7" of the radio frame 804, as also depicted in FIG. 9.

Figure 10:
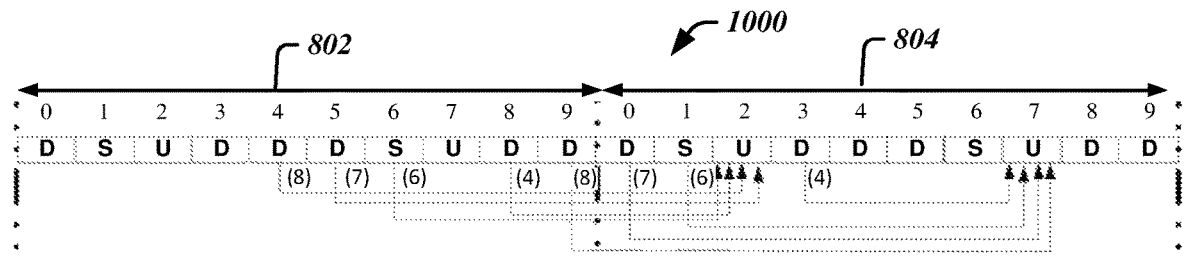
FIG. 10 depicts a further mapping arrangement consistent with the present embodiments.

The downlinks in other UL-DL configurations of "Group 1" may be mapped to one of the common uplink subframes "2" or "7" in a manner similarly to that described above with respect to configurations "0" and "1." Thus, turning to the exemplary arrangement 1000 of FIG. 10, the downlink subframes "4", "5", "6" and "8" of radio frame 802 may be mapped to subframe "2" of radio frame 804, and the downlink subframe "9" of radio frame 802 and subframes "0", "1", and "3" of radio frame 804 may be mapped to subframe "7" of the radio frame 804.

Figure 11:
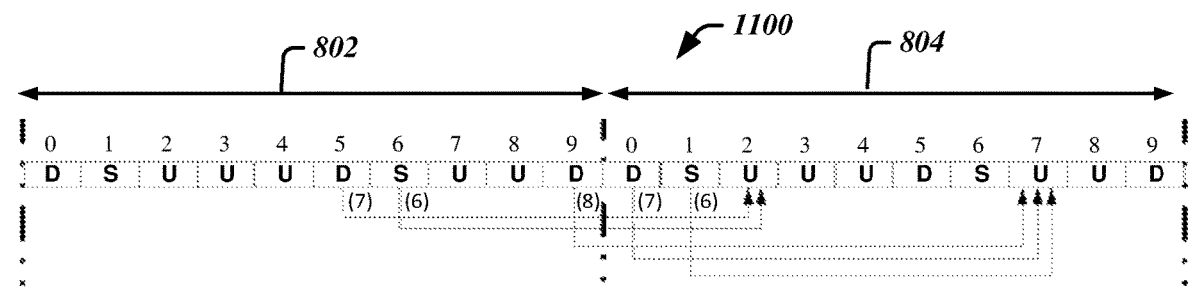
FIG. 11 depicts a mapping arrangement consistent with additional embodiments.

FIG. 11 depicts a mapping arrangement 1100 for the final UL-DL configuration ("6") of the "Group 1" of FIG. 7. In this case, the UL-DL configuration contains an odd number of subframes capable of supporting downlink transmissions. In particular, five subframes "0", "1", "5", "6", and "9" are each mapped to one of the subframes "2" and "7" for transmitting an uplink ACK/NAK message. According to the mapping procedure specified in the adapted downlink association set index 700, two downlinks are mapped to uplink subframe "2." In particular, the indices "7" and "6" specify the mapping of downlink subframes that occur at the seventh and sixth subframes, respectively, before a subframe "2" of a subsequent radio frame. This leads to the scenario illustrated in FIG. 11, where the downlink subframes "5" and "6" of radio frame 802 map to the uplink subframe "2" of subsequent radio frame 804. The additional three downlink subframes "9", "0" and "1," are mapped to uplink "7" via the indices "8", "7" and "6" listed in the subframe "7" column of UL-DL configuration "6" of FIG. 7.

In the above manner, all downlink subframes of all the UL-DL configurations of "Group 1" are mapped to one of two uplink subframes for carrying an ACK/NAK message in response to a downlink transmission.

One feature of the embodiments illustrated in FIGS. 7, and 8-11 is that the timing of uplink responses takes advantage of an uplink subframe that is common to all UL-DL configurations within the "Group 1", that is, subframes "2" and "7." This facilitates the ability to schedule a HARQ ACK/NAK response in interband carrier scenarios where only the Pcell is permitted to transmit the HARQ ACK/NAK. Since each UL-DL configuration is arranged to feedback the HARQ ACK/NAK on a common subframe, the transmission of PDSCH over a downlink of a first carrier using a first UL-DL configuration is assured of being able to be fed back on the Pcell regardless of the UL-DL configuration of the PCell interband carrier. In addition, only one physical uplink control channel (PUCCH) for carrying the HARQ ACK/NAK is transmitted, while possible acknowledgement responses to downlink transmissions are distributed over two different uplink subframes according to the subframe carrying the downlink transmission.

Turning once more to FIG. 7, it is shown that the "Group 2" of adapted downlink association set index 700 comprises the UL-DL configurations "3" and "4." As shown in FIG. 7, the subframes "2" and "3" of these configurations are populated with indices that specify the mapping of downlink subframes to the subframes "2" and "3", which represent the common uplink sub-frames shared by both configurations "3" and "4" of "Group 2." Thus, the adapted downlink association set index 700 may operate in a manner similarly to that described for the UL-DL configuration "Group 1," namely, to map all downlink subframes within each configuration to one of the common uplink subframes "2" or "3."

The final group of the adapted downlink association set index 700 ("Group 3") is represented by a single UL-DL configuration ("5"). As illustrated in FIG. 2c, the UL-DL configuration "5" includes nine downlink subframes, with subframe "2" as the sole uplink subframe. Accordingly, all the other subframes may be mapped as illustrated in FIG. 7 to uplink subframe "2."

Thus, the adapted downlink association set index 700 provides a mapping by groups of UL-DL configurations that ensures that a downlink transmission carried by a first component carrier of an Scell can be acknowledged in an uplink by an interband component carrier of the Pcell that may have a different UL-DL configuration. The dividing of the seven UL-DL configurations into groups may facilitate better use of uplink subframe resources for carrying a HARQ ACK/NAK by distributing possible reply messages over multiple subframes.

Figure 12:
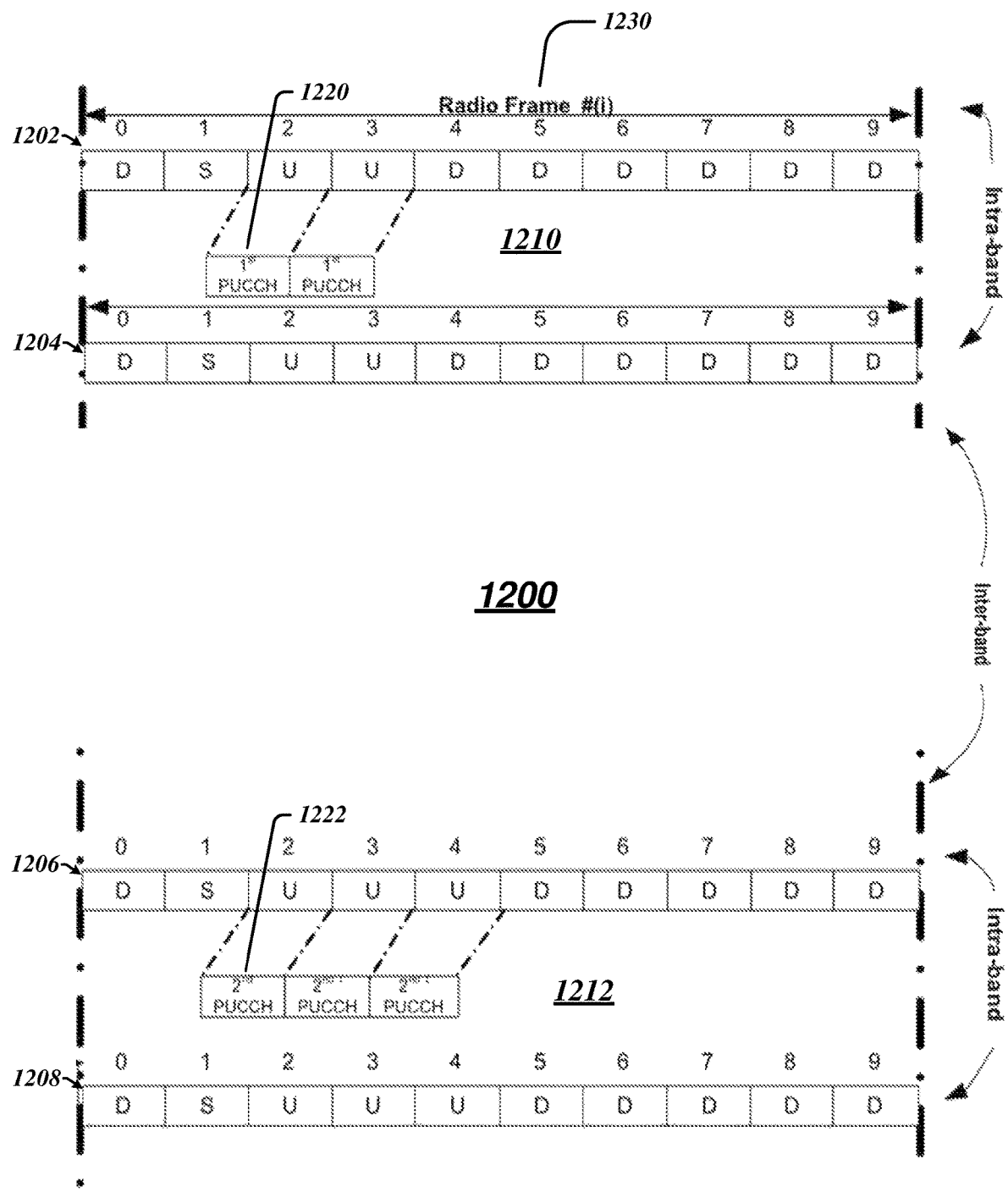
FIG. 12 depicts an exemplary interband carrier aggregation scenario.

In further embodiments, the scheduling of interband reply messages to downlink transmissions may be modified from the current LTE-A standard to permit the transmission of multiple PUCCHs from a UE. In some embodiments, for example, a UE may access multiple component carriers of an eNB, where a first PUUCH is scheduled for transmission over a Pcell and a second PUCCH is scheduled for transmission over an Scell. FIG. 12 depicts one arrangement 1200 in which an eNB may schedule four different component carriers 1202, 1204, 1206, and 1208 that include two component carriers 1202, 1204 within a first band 1210 and two other component carriers 1206, 1208 in a second band 1212. In the scenario illustrated in FIG. 12, a first component carrier 1202 and a second component carrier 1204 of the band 1210 are arranged in the UL-DL configuration "4" as specified in FIG. 2c. As illustrated, the first PUCCH 1220 may be transmitted on uplinks corresponding to subframe "2" or subframe "3" of the radio frame 1230 for component carrier 1202, which may represent the PCell. The scenario of FIG. 12 specifically shows two successive copies of the PUCCH 1220 being transmitted in successive subframes "2" and "3" of radio frame 1230.

In addition, a separate PUCCH 1222 may be transmitted over an SCell carrier, such as component carrier 1206 of band 1212. In this case, the component carriers 1206 and 1208 are arranged in a configuration "3" in which subframes "2", "3" and "4" are arranged as uplinks, and may thus carry the second PUCCH 1222 in one or more copies as illustrated in FIG. 12.

It is to be noted that the arrangement of FIG. 12 may be applied in cases where the conventional TDD downlink association set index as specified in LTE release 10 is used to schedule uplink PUCCHs. However, if a downlink transmission is scheduled that results in the PCell component carrier 1202 not supporting a PUCCH for the uplink subframe specified for UL-DL configuration of the Pcell, the PUCCH may be transmitted over the (interband) component carrier 1206 over a different uplink subframe provided by the different UL-DL configuration of component carrier 1206.

Figure 13:
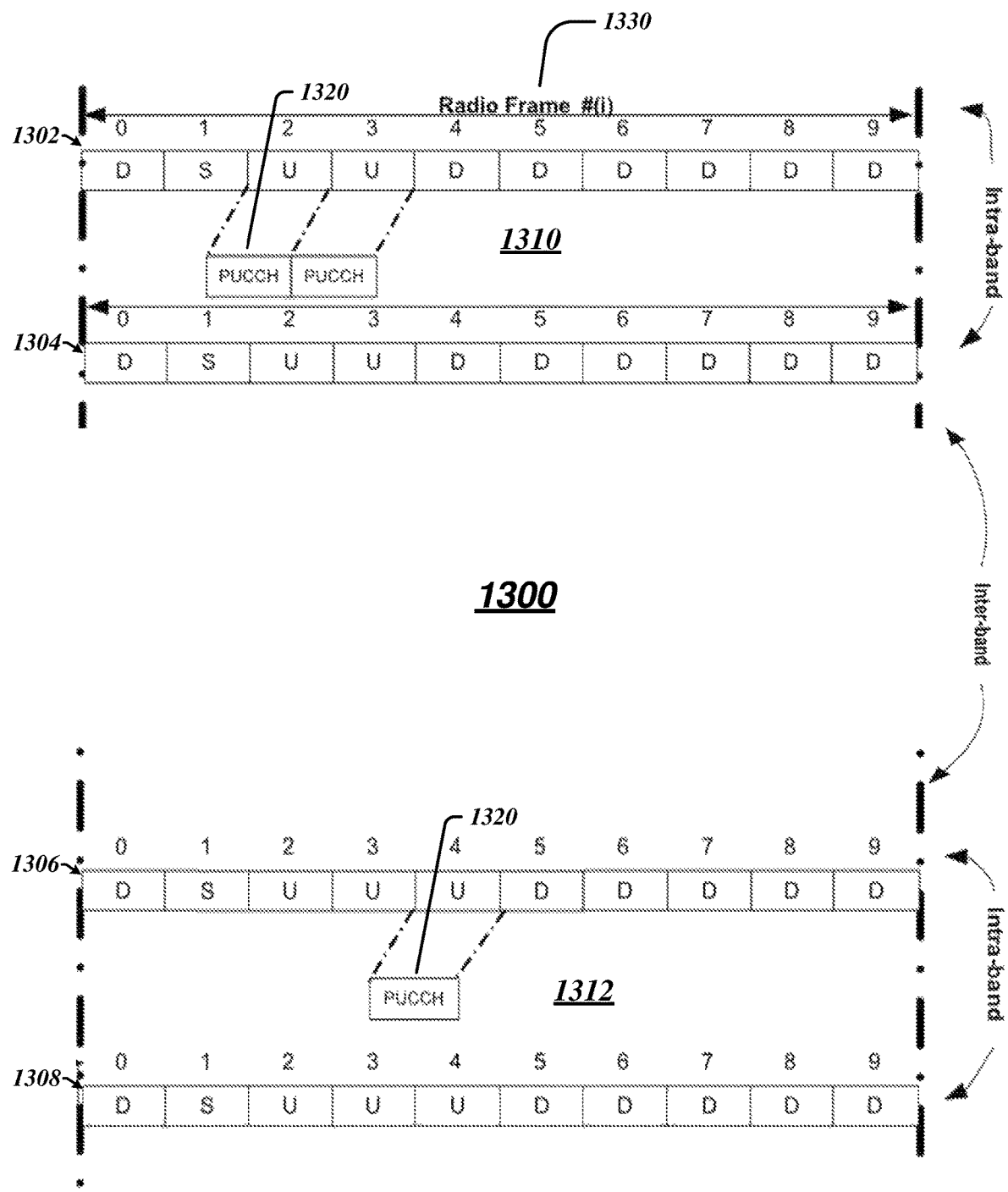
FIG. 13 depicts another exemplary interband carrier aggregation scenario.

FIG. 13 depicts another embodiment for feedback of an acknowledgement message using an interband carrier. In the arrangement 1300, similarly to arrangement 1200, four different component carriers 1302, 1304, 1306, and 1308 are distributed among two bands 1310 and 1312, as shown. The Pcell may support component carrier 1302, which may be configured to feedback a PUCCH 1320 over either subframe "2" or "3" for the UL-DL configuration "4" as in FIG. 12. However, in cases where a downlink transmission is scheduled that results in the PCell component carrier 1302 not supporting a PUCCH for the uplink subframe specified for UL-DL configuration of the Pcell, the PUCCH 1320 may be transmitted over the (interband) component carrier 1306 over a different uplink subframe ("4") provided by the different UL-DL configuration ("3") of the component carrier 1306. In this latter embodiment, only one PUCCH need be transmitted over a single uplink subframe on one of the uplink carrier frequencies for a given UE.

Figure 14:
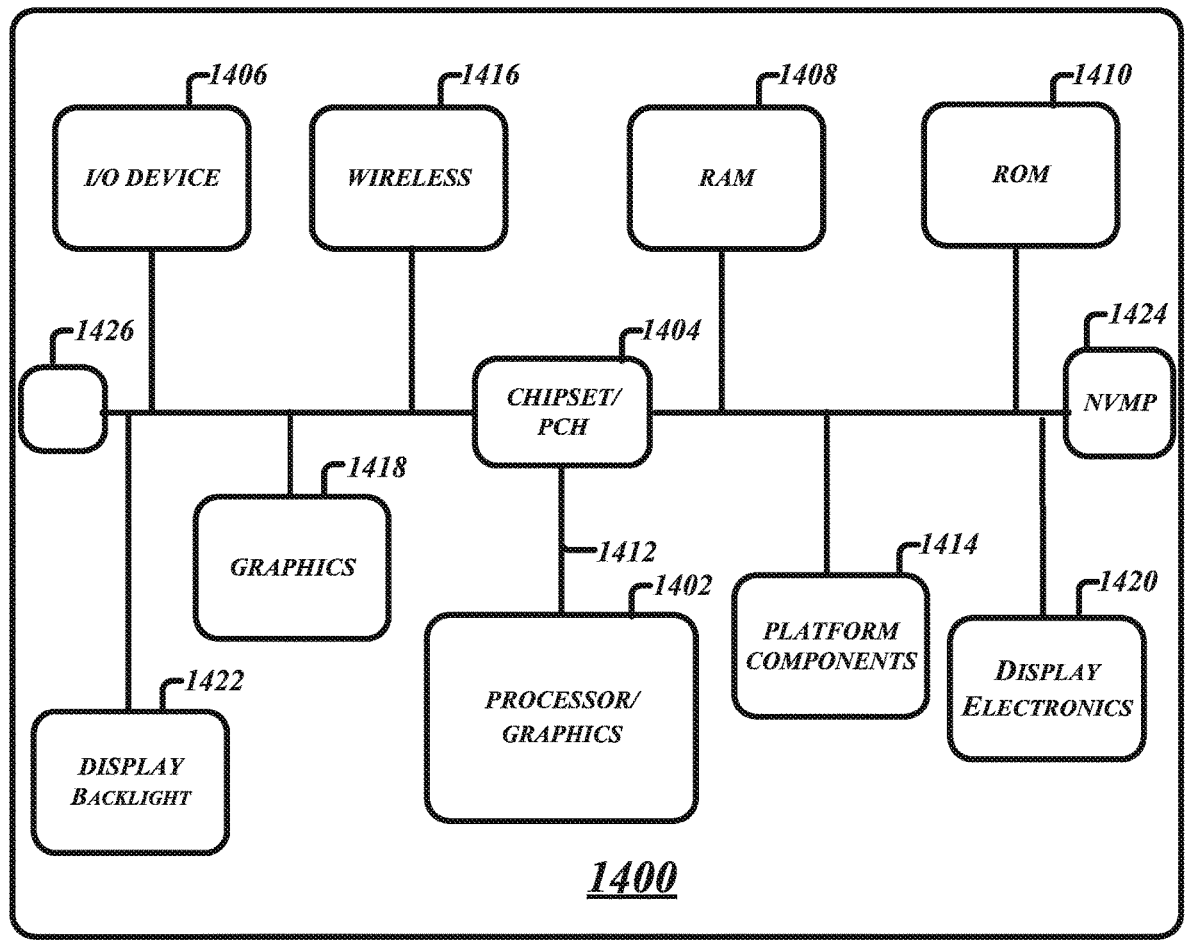
FIG. 14 is a diagram of an exemplary system embodiment.

FIG. 14 is a diagram of an exemplary system embodiment and in particular, FIG. 14 is a diagram showing a platform 1400, which may include various elements. For instance, FIG. 14 shows that platform (system) 1410 may include a processor/graphics core 1402 which may include an applications processor, a chipset/platform control hub (PCH) 1404, an input/output (I/O) device 1406, a random access memory (RAM) (such as dynamic RAM (DRAM)) 1408, and a read only memory (ROM) 1410, display electronics 1420, display backlight 1422, non-volatile memory port (NVMP) 1424, antenna 1426, and various other platform components 1414 (e.g., a fan, a crossflow blower, a heat sink, DTM system, cooling system, housing, vents, and so forth). System 1400 may also include wireless communications chip 1416 and graphics device 1418. The display electronics may include a liquid crystal display (LCD) screen, touch screen display, or other display. The I/O device 1406 may include a keyboard, mouse, and/or speakers. The embodiments, however, are not limited to these elements.

As shown in FIG. 14, I/O device 1406, RAM 1408, and ROM 1410 are coupled to processor 1402 by way of chipset 1404. Chipset 1404 may be coupled to processor 1402 by a bus 1412. Accordingly, bus 1412 may include multiple lines.

Processor 1402 may be a central processing unit comprising one or more processor cores and may include any number of processors having any number of processor cores. The processor 1402 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1402 may be multiple separate processors located on separate integrated circuit chips. In some embodiments processor 1402 may be a processor having integrated graphics, while in other embodiments processor 1402 may be a graphics core or cores.

Figure 15:
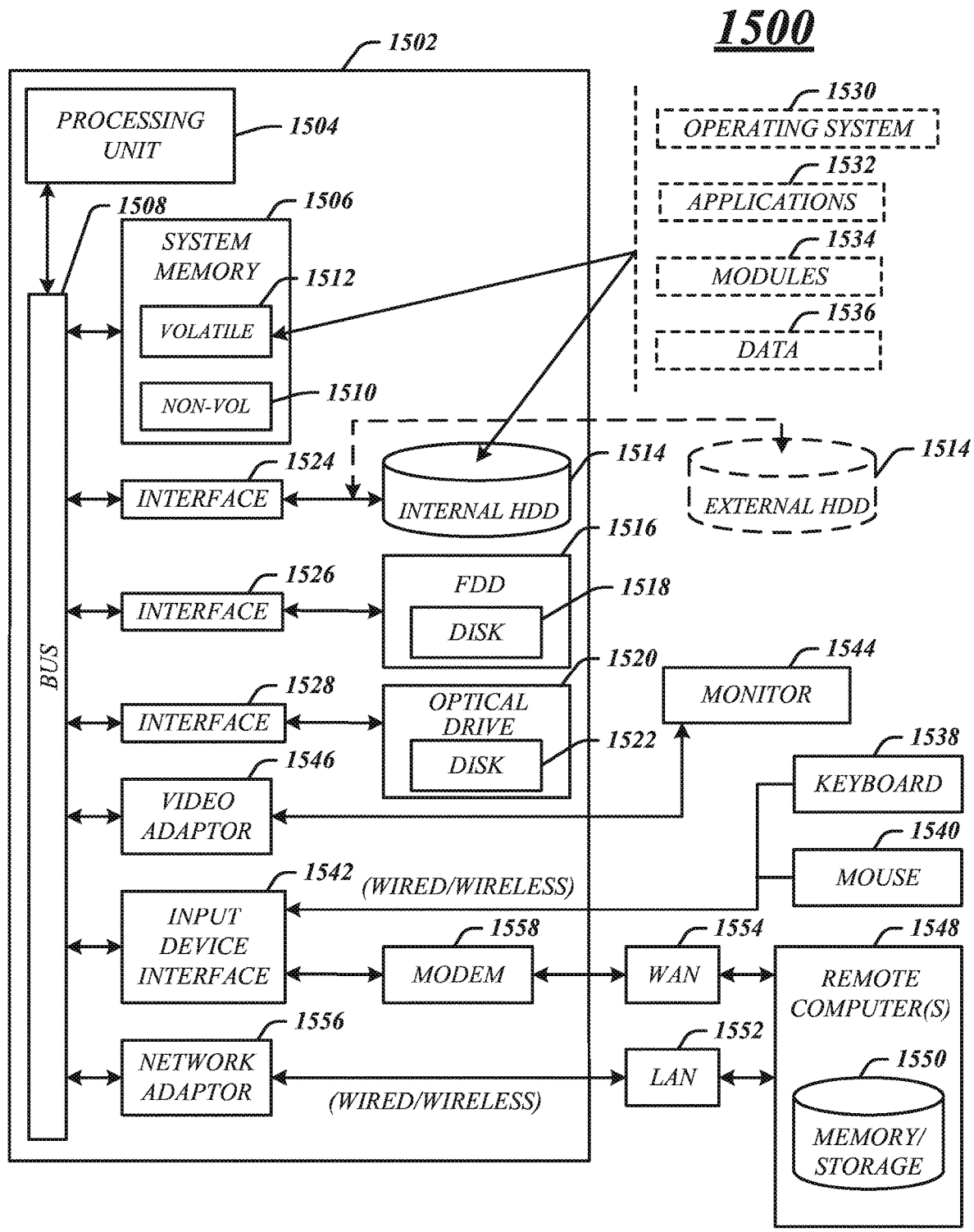
FIG. 15 illustrates an embodiment of an exemplary computing architecture.

FIG. 15 illustrates an embodiment of an exemplary computing architecture 1500 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1594 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a radio frequency (RF) transceiver to receive a first message over a first carrier in a first band in a downlink sub-frame of a first radio frame in a communications link, the communications link comprising interband carriers aggregated over a primary and a secondary cell;
   a processor coupled to the RF transceiver; and
   a memory coupled to the processor, the memory to store instructions operable on the processor to:
   determine a downlink sub-frame in which the downlink transmission is received; and
   adjust timing of a reply message to be sent by the RF transceiver in response to the first message so as to coincide with a predetermined uplink sub-frame of a radio frame; and
   the memory to store an adapted downlink association set index, the adapted downlink association set index to map, for each of a multiplicity of uplink-downlink configurations, one or more downlink sub-frames for carrying the first message to a common uplink sub-frame of a radio frame for carrying the reply message.

2. The apparatus of claim 1, the RF transceiver arranged to receive the first message over the secondary cell and to send the reply message over the primary cell.

3. The apparatus of claim 1, the adapted downlink association set index comprising a single sub-frame of a radio frame for carrying the reply message in one or more uplink-downlink configurations.

4. The apparatus of claim 1, the radio frame comprising a time division duplex radio frame having ten sub-frames, each uplink-downlink configuration comprising an arrangement of uplink subframes and downlink subframes that is different from each other uplink-downlink configuration.

5. A non-transitory computer-readable storage medium containing instructions that when executed by a processor enable a system to:
   receive indication of a first message received over a first carrier in a first band in a downlink sub-frame of a first radio frame in a communications link, the communications link comprising interband carriers aggregated over a primary and a secondary cell;
   determine a downlink sub-frame in which the downlink transmission is received; and
   adjust timing of a reply message to be sent by a radio-frequency (RF) transceiver in response to the first message so as to coincide with a predetermined uplink sub-frame of a radio frame based on an adapted downlink association set index, the adapted downlink association set index to map, for each of a multiplicity of uplink-downlink configurations, one or more downlink sub-frames for carrying the first message to a common uplink sub-frame of a radio frame for carrying the reply message.

6. The non-transitory computer-readable medium of claim 5 containing instructions that when executed by a processor enable a system to receive indication of the first message received over the secondary cell and to cause the RF transceiver to send the reply message over the primary cell.

7. The non-transitory computer-readable medium of claim 5, the adapted downlink association set index comprising a single sub-frame of a radio frame for carrying the reply message in one or more uplink-downlink configurations.

8. The non-transitory computer-readable medium of claim 5, the radio frame comprising a time division duplex radio frame having ten sub-frames, each uplink-downlink configuration comprising an arrangement of uplink subframes and downlink subframes that is different from each other uplink-downlink configuration.

9. A method, comprising:
   receiving a first message over a first carrier in a first band in a downlink sub-frame of a first radio frame in a communications link, the communications link comprising interband carriers aggregated over a primary and a secondary cell;
   determining a downlink sub-frame in which the downlink transmission is received; and
   adjusting timing of a reply message to be sent by a radio-frequency (RF) transceiver in response to the first message so as to coincide with a predetermined uplink sub-frame of a radio frame based on an adapted downlink association set index, the adapted downlink association set index to map, for each of a multiplicity of uplink-downlink configurations, one or more downlink sub-frames for carrying the first message to a common uplink sub-frame of a radio frame for carrying the reply message.

10. The method of claim 9, comprising receiving the first message over the secondary cell and sending the reply message over the primary cell.

11. The method of claim 9, the adapted downlink association set index comprising a single sub-frame of a radio frame for carrying the reply message in one or more uplink-downlink configurations.

12. The method of claim 9, the radio frame comprising a time division duplex radio frame having ten sub-frames, each uplink-downlink configuration comprising an arrangement of uplink subframes and downlink subframes that is different from each other uplink-downlink configuration.

* * * * *